Nov. 4, 1941.     E. G. L. GIRARD     2,261,247
MOLDING DEVICE
Filed Dec. 31, 1936     3 Sheets-Sheet 1

E. G. L. Girard
Inventor

By: Glascock Downing & Seebold
Attys.

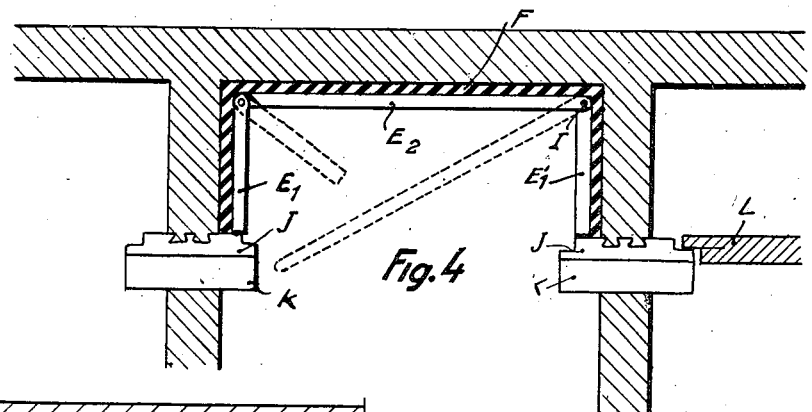
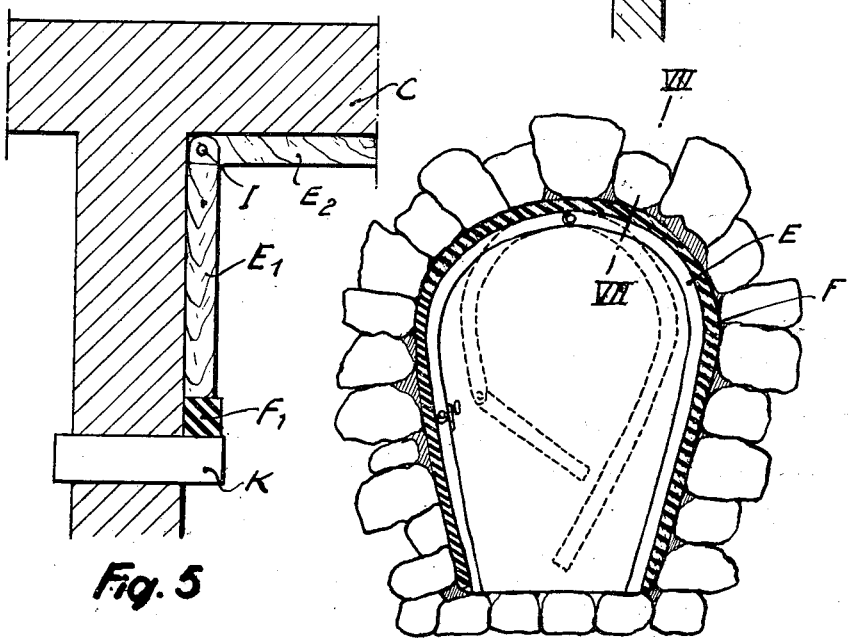
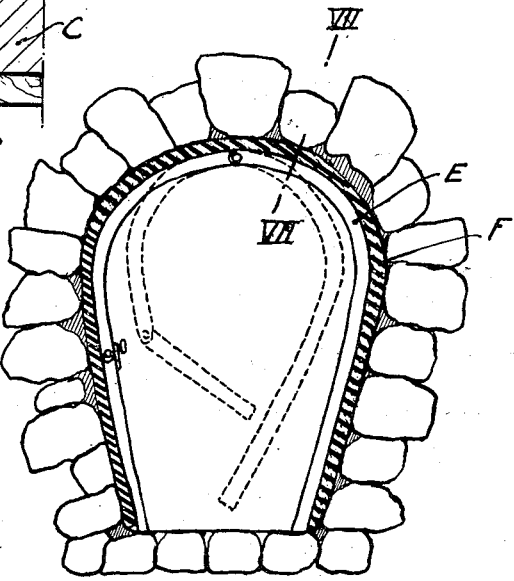
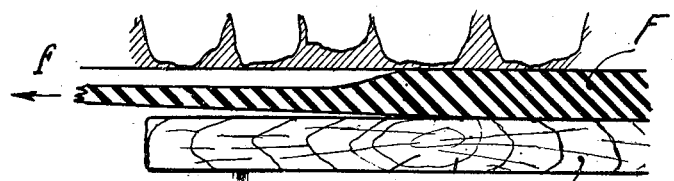

Nov. 4, 1941.  E. G. L. GIRARD  2,261,247
MOLDING DEVICE
Filed Dec. 31, 1936  3 Sheets-Sheet 3

Patented Nov. 4, 1941

2,261,247

UNITED STATES PATENT OFFICE 2,261,247

MOLDING DEVICE

Emile Gustave Louis Girard, Paris, France

Application December 31, 1936, Serial No. 118,691
In France January 2, 1936

4 Claims. (Cl. 25—131.5)

My invention relates to molding devices.

Up to this time the molding of a large number of objects and more particularly that of construction elements made of concrete or reinforced concrete was carried out by using a rigid mold made of wood, iron, or the like. After dismantling of these elements, recuperation thereof may be possible, but, due to the adhesion of the molded material to the walls of the mold, and the intricate shapes of the mold, dismantling of the mold elements is a rather laborious and very difficult matter. In certain cases, and more especially in the building of reinforced concrete floors, the molds used in centering are generally made of bricks which are abandoned in the finished work.

It has already been proposed to mold tubular parts by using a hollow deformable core, such as a balloon inflated with air or a rubber hose which may be deformed either by deflation thereof or by submitting same to a traction effort.

It may readily be seen that such a method can be carried out only in connection with objects having a particular shape, such as tubular parts or the like.

The object of the present invention is to provide a molding device which obviates the above mentioned drawbacks.

According to the essential feature of the invention, the mold, consisting of rigid elements, is used in combination with a layer of a suitable elastic or plastic matter, such as common or spongy rubber, or the like, which is inserted either between one or several outer faces of the mold and the molded material, or between two elements of the mold.

This sheet or layer of plastic material is so arranged with respect to the mold elements that it permits, owing to its deformation, of taking the mold to pieces and withdrawing it.

Several preferred embodiments of my invention will be hereinafter described with reference to the accompanying drawings, in which like reference characteristics refer to like parts throughout:

Figs. 4 and 5 show other embodiments of Fig. 1 in which an adjustable mold is used;

Figs. 8 and 9 show the invention as applied to the construction of a canal made of stone, Fig. 8 being a transverse section and Fig. 9 a section on a larger scale on line VII—VII Fig. 8.

Figure 1:
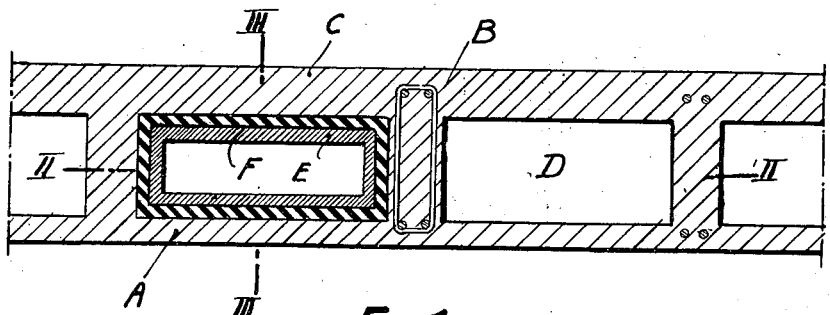
Fig. 1 is a transverse section of a mold according to the invention as applied to the construction of a floor.
Figure 2:
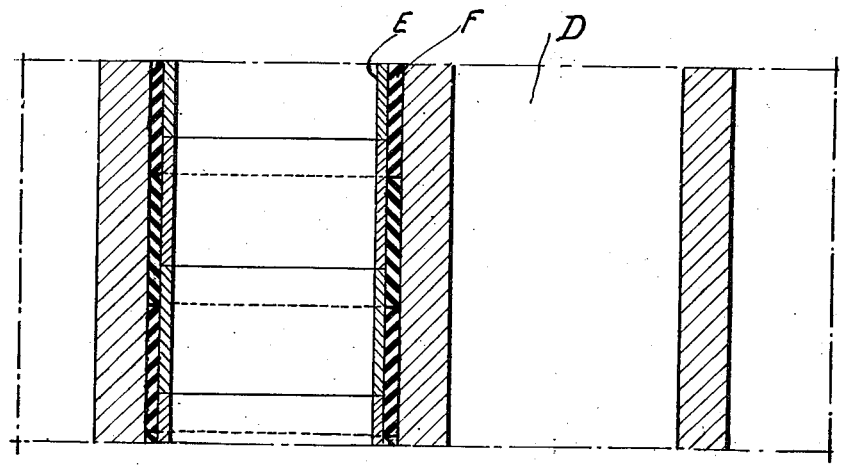
Fig. 2 is a section on line II—II of Fig. 1.
Figure 3:
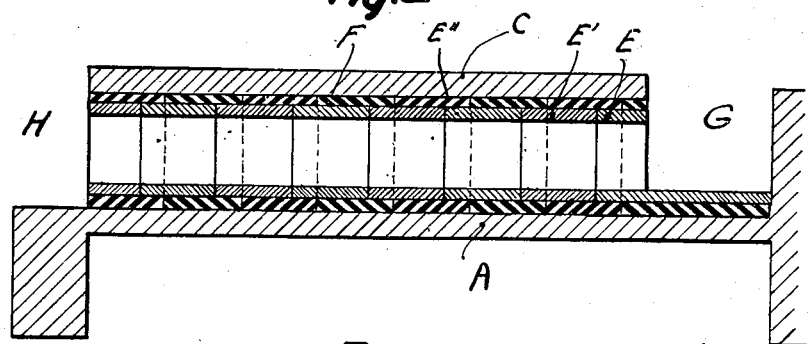
Fig. 3 is a section on line III—III of Fig. 1.

In the embodiment shown in Figs. 1 to 3, the invention is shown as applied to a floor in which the bottom and top portions consist of a layer of concrete or of bricks A, and which comprises reinforced concrete ribs B. The free spaces D between the various ribs B are obtained in the known manner in using an appropriate mold E.

Instead of being in direct contact with the vibrated concrete, the four faces of the mold, which for instance may be made of wood, are lined with sheets F of an elastic material such as defined hereabove.

After molding of the concrete and proper hardening thereof, either under normal setting or by vibration, the elastic bands or sheets F may be removed by pulling same through a hopper G provided in the upper or lower portion of the floor.

After removal of the elastic bands, a hollow space is formed between the mold E and the concrete walls whereby the mold may be freely moved along passage D. The rigid mold is preferably formed by a series of interconnected caissons E, E′, E″, etc. These various elements may be dismantled in sections and removed either through the hopper G or through the opposite portion H, and may thus be used again.

It is to be noted that the system according to my invention may be used in combination with the method in which the mold proper consists of a flexible, armoured rubber hose provided with hoops such as to permit longitudinal deformation thereof. Due to the elasticity of a mold of this type the same can readily be removed as a whole through the hopper G or the like.

Fig. 4 is another embodiment of the invention showing a ceiling made of hollow bricks which may be set in place after removal of the floor section of the mold. In this case, the mold E, of which the faces in contact with the concrete are likewise covered with a layer or band of plastic material F, may comprise several elements mounted for pivotal movement to each other, so that the mold may be dismantled by rotation of the vertical element $E_1$ about hinges I which connect the horizontal element $E_2$ to $E_1$.

The relative displacements of these parts determine a deformation of the elastic lining material F, so that the molds may be removed without any difficulty, even in that case where bricks, such as J, beneath the ribs B should protrude beyond the vertical faces of the layers K. After dismantling of the mold, the ceiling may be finished in the usual manner by the laying of bricks L carried upon the bricks J interposed between the concrete and supports K.

Fig. 5 shows another embodiment of my invention in which the outer layer F may be omitted, a bloc $F_1$ being substituted which may be inserted either between the two elements $E_1$—$E_2$, or between elements $E_1$ and their supporting base. The plastic bloc $F_1$ reacts in a manner similar to that hereabove described, and it may be removed by traction, or it may be simply deformed so as to permit dismantling of the mold.

Figure 6:
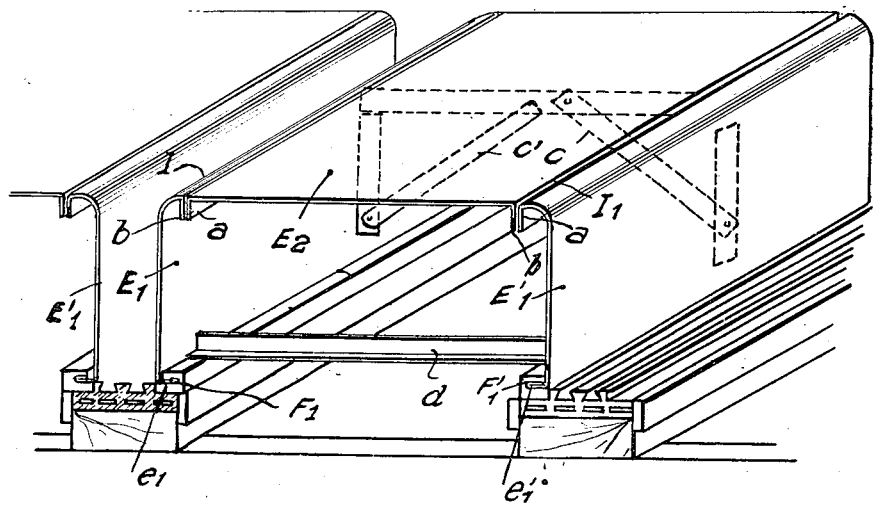
Figs. 6 and 7 show, on a larger scale, another embodiment of an adjustable mold in perspective and in section respectively.
Figure 7:
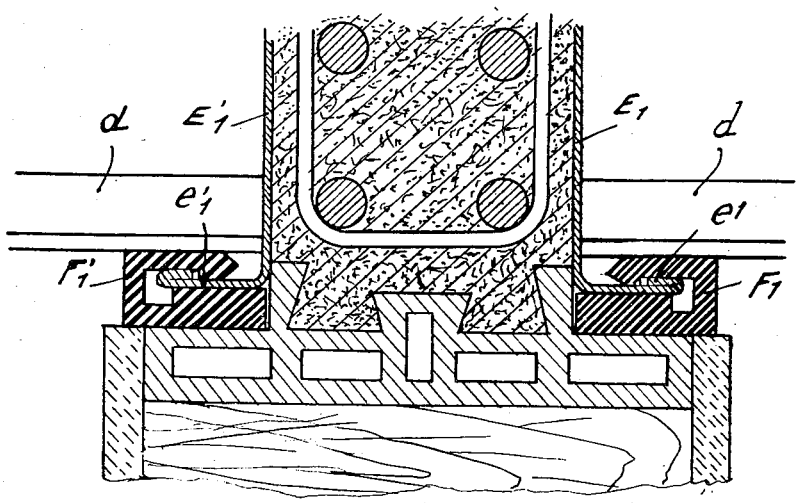

In the embodiment shown by Figs. 6 and 7, the mold consists of three sheet iron elements $E_1$, $E'_1$ and $E_2$ which are mounted for pivotal movement about two axes I and I', the edges of two adjoining elements being bent over in $ab$ so as to form abutting flanges. The transverse rigidity of the caisson thus formed is realized by means of cross braces which are secured in place by a suitable pin connection.

At their lower ends the lateral sections $E_1$, $E'_1$ are accurately spaced and securely held in position by means of angle irons $d$ provided within the mold and which are carried by the elastic blocs $F_1$. These blocs, which are secured upon the lower portion of plates $E_1$ act in a manner similar to that described hereabove.

The blocs $F_1$ are connected to the lower edges $e_1$ and $e'_1$ of sheets $E_1$ and $E'_1$; to this effect the lower edges of the sheets are firstly folded over at right angle and a second time about 180° such as to form a bead which eventually prevents sliding movement of the elastic bloc.

It is well understood that the invention does not exclusively relate to floor constructions, but may as well be used in connection with any work requiring the use of a mold. Figs. 8 and 9 thus show the invention as applied to the construction of a canal built of stones.

The centering or false work in this construction likewise comprises a rigid part (formed e. g. of several elements $E_1$, $E_2$ arranged for pivotal movement about I), lined with one or several layers of elastic material F.

After the stone work M of the canal has been finished in the usual manner, the centering may be dismantled either in swinging the elements $E_1$, $E_2$ about pivot I, or by direct removal of the elastic material F. Fig. 9 shows more specifically in what manner the flattening out of the matter F takes place under the pulling effort exerted in the direction of the arrow $f$ producing the free space required for effecting the removal.

While I have shown preferred embodiments of my invention it is to be understood that I do not confine myself to the precise details of construction herein set forth by way of illustration as is apparent that my invention may as well be used in connection with any other kind of construction, and that the elastic material may be realized in many different ways. Furthermore, instead of rubber sheets, it is understood that a solid material may be used, in which cavities, cells or channels are provided which are arranged to permit of being successively inflated or deflated by means of an appropriate element such as water, air, or the like.

What I claim as new and desire to secure by Letters Patent of the United States is:

1. In combination in a molding device, a rigid support provided with at least one bearing surface, a mold having at least two mold sections hinged to each other and adapted to form the carcass of the mold, and intermediate resilient means inserted between one of said mold sections and said bearing surface.

2. For use in connection with a rigid stationary structure provided with at least one horizontal bearing surface, a molding device which comprises, in combination, at least two mold sections hinged to each other at their top parts about a substantially horizontal line and adapted to form the walls of the mold and at least one intermediate rubber band inserted between the lower face of one of said mold sections and said bearing surface of the stationary structure, whereby deformation and removal of said band permits of reciprocal pivoting movement of said mold sections and removing of the whole from said stationary structure.

3. For use in connection with a rigid stationary structure including a series of substantially horizontally disposed parallel supports a molding device which comprises, in combination, at least two mold sections forming lateral mold walls, said mold sections being interconnected at the top so that they can pivot on an arcuate path in the direction of said supports, and one band of resilient material inserted between the lower edge of each of said mold sections and the corresponding support, so that said molding device bears on said rigid structure through said resilient bands, whereby deformation and removal of said bands permits of reciprocal pivoting movement of said mold sections toward each other and removing the whole from said rigid structure.

4. The arrangement claimed in claim 2, in which the molding device comprises two mold sections forming the lateral walls, and a third mold section hingedly connected to said wall sections and forming the top wall of the mold.

EMILE GUSTAVE LOUIS GIRARD.